United States Patent
Raju et al.

(10) Patent No.: US 11,733,914 B2
(45) Date of Patent: Aug. 22, 2023

(54) DIRECT WRITE OPERATION FOR QUAD-LEVEL CELL BASED DATA STORAGE DEVICES

(71) Applicant: Western Digital Technologies, Inc., San Jose, CA (US)

(72) Inventors: Raviraj Raju, Bangalore (IN); Sridhar Prudvirag Gunda, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/514,441

(22) Filed: Oct. 29, 2021

(65) Prior Publication Data

US 2023/0140773 A1   May 4, 2023

(51) Int. Cl.
G06F 3/06 (2006.01)

(52) U.S. Cl.
CPC .......... G06F 3/0656 (2013.01); G06F 3/064 (2013.01); G06F 3/0619 (2013.01); G06F 3/0631 (2013.01); G06F 3/0652 (2013.01); G06F 3/0659 (2013.01); G06F 3/0679 (2013.01)

(58) Field of Classification Search
CPC .... G06F 3/0656; G06F 3/0619; G06F 3/0631; G06F 3/064; G06F 3/0652; G06F 3/0659; G06F 3/0679
See application file for complete search history.

(56) References Cited

U.S. PATENT DOCUMENTS

| 10,521,118 B2 | 12/2019 | Benisty et al. | |
|---|---|---|---|
| 10,564,879 B2 | 2/2020 | Byun | |
| 10,592,157 B2 | 3/2020 | Lin et al. | |
| 10,635,580 B2 | 4/2020 | Bordia et al. | |
| 2019/0377508 A1* | 12/2019 | Bahar | G06F 3/0632 |
| 2020/0098423 A1* | 3/2020 | Huang | G11C 11/419 |
| 2020/0210101 A1 | 7/2020 | Lin | |
| 2022/0137874 A1* | 5/2022 | Hsu | G06F 3/0634 |
| | | | 711/154 |

* cited by examiner

*Primary Examiner* — Edward J Dudek, Jr.
(74) *Attorney, Agent, or Firm* — Michael Best & Friedrich LLP

(57) ABSTRACT

A QLC based data storage device leverages a host memory buffer (HMB) to achieve QLC direct write that increases performance of the QLC data storage device and reducing or eliminating disadvantages associated with a QLC folding approach. In one example, the QLC based data storage device includes a controller configured to receive a request to write data to a non-volatile memory, determine whether the request is a sequential write operation, determine whether a HMB of the data storage device is enabled, determine whether a HMB allocation is successful for a quad-level cell direct write, and responsive to determining that the request is not the sequential write operation, the HMB of the data storage device is enabled, and the HMB allocation is successful for the quad-level cell direct write, perform a direct write operation in a quad-level cell block of the non-volatile memory.

17 Claims, 5 Drawing Sheets

| Category | Description | Timing (us) |
|---|---|---|
| Basic NAND operations | QLC foggy program | 3000 |
| | QLC fine program | 6742 |
| | SLC program avg. | 160 |
| | SLC sense | 45 |
| | QLC LP/MP/TP sense | 175 |
| | QLC UP sense AP NR | 140 |
| | SLC erase | 5000 |
| | QLC erase | 6500 |

FIG. 5

| Category | Description | Timing (uS) |
|---|---|---|
| QLC Write with folding | SLC Write 4 blocks | 245760 |
| | SLC read 4 blocks | 69120 |
| | QLC foggy write 1 Block | 1152000 |
| | QLC fine write 1 Block | 2588928 |
| | SLC erase | 20000 |
| | QLC Erase | 6500 |
| | Total Latency for QLC block write, folding method | 4082308 |
| QLC Direct write | QLC direct write of 1 block | 2588928 |
| | QLC Erase | 6500 |
| | Total Latency for QLC Direct Write method | 2595428 |

FIG. 6

DIRECT WRITE OPERATION FOR QUAD-LEVEL CELL BASED DATA STORAGE DEVICES

FIELD

This application relates generally to data storage devices, and more particularly, to a controller that controls write operations of a quad-level cell ("QLC") based data storage device.

BACKGROUND

Generally, QLC based data storage devices (e.g., a QLC solid state drive ("SSD")) are configured to store four bits of data using sixteen voltage states. QLC based data storage devices have greater storage density than traditional single-level cell ("SLC"), multiple-level cell ("MLC"), and triple-level cell ("TLC") data storage devices. However, the increased density resulting from having sixteen voltage states makes identification of a value of an individual cell difficult. Generally, folding techniques are used to perform direct write operations, however this leads to performance degradation due to extensive relocation. Thus, while QLC based data storage devices may have greater storage density, write speeds for QLC based data storage device may be slower than traditional data storage devices. Typically, caching techniques on the QLC based data storage device are used to remedy this issue. For example, a portion of the data storage device may be used as an SLC cache to improve write speeds. Thus, the cache may be written to at speeds found in traditional data storage devices and the data written to SLC cells may be relocated to QLC cells of the data storage device.

A host memory buffer (or host managed buffer) ("HMB") is a feature used by SSDs to take advantage of direct memory access ("DMA") capabilities of peripheral component interconnect express ("PCIe") to allow SSDs to use dynamic random-access memory ("DRAM") attached to a host processor, instead of requiring SRAM of the SSD. The HMB is not used to replace onboard SRAM of an SSD, however may be used for cache mapping information of flash.

SUMMARY

QLC based data storage devices may utilize an SLC cache to improve write speeds. Many host devices also support the use of HMB memory for storing cache mapping information. A QLC based data storage device of the present disclosure leverages the HMB to achieve QLC direct write to increase performance of the data storage device and reducing or eliminating the above disadvantages associated with the folding approach.

One embodiment of the present disclosure includes a data storage device including a non-volatile memory and a controller. The controller is configured to receive a request to write data to the non-volatile memory, determine whether the request to write the data is a sequential write operation, determine whether a host memory buffer of the data storage device is enabled, determine whether a host memory buffer allocation is successful for a quad-level cell direct write, and responsive to determining that the request to write the data is not the sequential write operation, the host memory buffer of the data storage device is enabled, and the host memory buffer allocation is successful for the quad-level cell direct write, perform a direct write operation in a quad-level cell block of the non-volatile memory.

Another embodiment of the present disclosure includes a method performed by a data storage device. The method includes receiving, with a controller, a request to write data to a non-volatile memory of the data storage device. The method includes determining, with the controller, whether the request to write the data is a sequential write operation. The method includes determining, with the controller, whether a host memory buffer of the data storage device is enabled. The method includes determining, with the controller, whether a host memory buffer allocation is successful for a quad-level cell direct write. The method also includes responsive to determining that the request to write the data is not the sequential write operation, the host memory buffer of the data storage device is enabled, and the host memory buffer allocation is successful for the quad-level cell direct write, performing, with the controller, a direct write operation in a quad-level cell block of the non-volatile memory.

Yet another embodiment of the present disclosure includes an apparatus. The apparatus includes means for receiving a request to write data to a non-volatile memory of a data storage device. The apparatus includes means for determining whether the request to write the data is a sequential write operation. The apparatus includes means for determining whether a host memory buffer of the data storage device is enabled. The apparatus includes means for determining whether a host memory buffer allocation is successful for a quad-level cell direct write. The apparatus also includes means for performing a direct write operation in a quad-level cell block of the non-volatile memory in response to determining that the request to write the data is not the sequential write operation, the host memory buffer of the data storage device is enabled and the host memory buffer allocation is successful for the quad-level cell direct write.

Various aspects of the present disclosure provide for improvements in data storage devices. For example, optimizing the processes in which write operations are handled by QLC based data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

BRIEF DESCRIPTION OF THE DRAWINGS

FIG. 5 is a table illustrating timing data for basic NAND operations, according to some embodiments.

FIG. 6 is a table illustrating timing data for QLC write with folding and QLC direct write operations, according to some embodiments.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein may be applicable to other types of solid-state memory, such as NOR, PCM ("Phase Change Memory"), ReRAM, etc.

Figure 1:
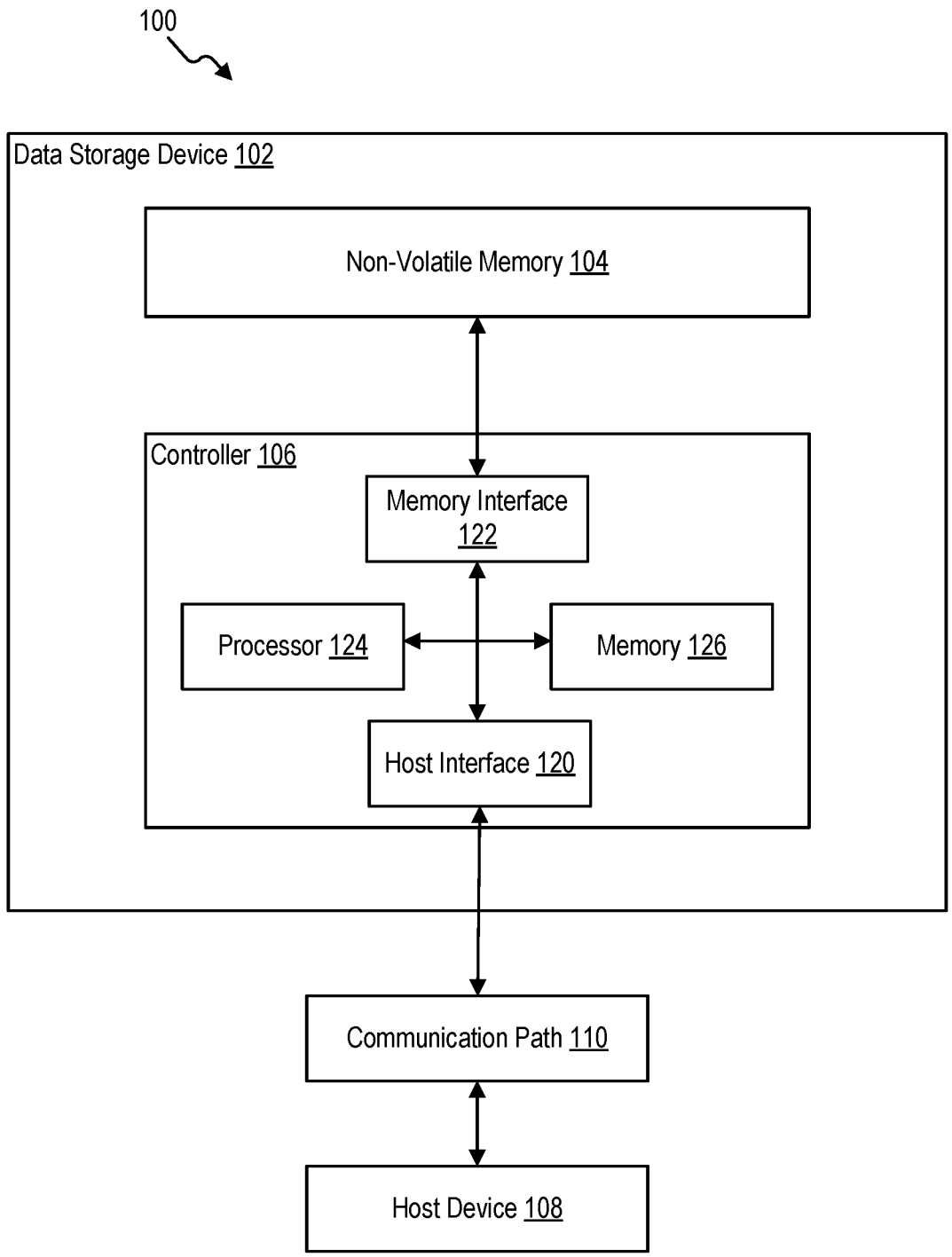
FIG. 1 is block diagram illustrating one example of a QLC based data storage device, according to some embodiments.

FIG. 1 is a block diagram illustrating one example of a QLC based data storage device 102, in accordance with some embodiments of the disclosure. In some implementations, the data storage device 102 is a flash memory device. For example, the data storage device 102 is a solid state drive ("SSD"), such as an NVMe SSD, a Secure Digital SD® card, a microSD® card, or another similar type of data storage device. The data storage device 102 illustrated in FIG. 1 includes a non-volatile memory 104, and a controller 106. The data storage device 102 is coupled to a host device 108.

In some examples, the data storage device 102 is a QLC based data storage device that contains four bits per cell and has sixteen possible voltage states. The data storage device may further include an SLC cache (one bit per cell and two possible voltage states).

The data storage device 102 and the host device 108 may be operationally coupled via a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to an SSD, which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 108, such as a wired communication path and/or a wireless communication path. For example, the data storage device 102 may include a host interface 120 that enables communication between the data storage device 102 and the host device 108, such as when the host interface 120 is communicatively coupled to the host device 108. In some examples, the communication between the data storage device 102 and the host device 108 includes transmitting data between the non-volatile memory 104 and the host device 108.

The host device 108 may include an electronic processor and a memory 126. The memory 126 may be configured to store data and/or instructions that may be executable by the electronic processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to a non-volatile memory 104 of the data storage device 102. For example, the host device 108 may be configured to provide data to be stored at the non-volatile memory 104 or to request data to be read from the non-volatile memory 104.

The host device 108 communicates via a memory interface 122 that enables reading from the non-volatile memory 104 and writing to the non-volatile memory 104. In some examples, the host device 108 may operate in compliance with an industry specification, such as a Universal Flash Storage (UFS) Host Controller Interface specification. In other examples, the host device 108 may operate in compliance with one or more other specifications, such as a Secure Digital (SD) Host Controller specification or other suitable industry specification. The host device 108 may also communicate with the non-volatile memory 104 in accordance with any other suitable communication protocol.

The non-volatile memory 104 of the data storage device 102 may include a non-volatile memory (e.g., NAND, BiCS family of memories, or other suitable memory). In some examples, the non-volatile memory 104 may be any type of flash memory. The non-volatile memory 104 may include one or more memory devices. For example, the non-volatile memory 104 may be two-dimensional (2D) memory or three-dimensional (3D) flash memory.

The non-volatile memory 104 may include support circuitry, such as read/write circuitry to support operation of the non-volatile memory 104. In some examples, the read/write circuitry may be implemented in a single component. Alternatively, in some examples, the read/write circuitry may be divided into separate components of the non-volatile memory 104, such as read circuitry and write circuitry.

The controller 106 includes a host interface 120, a memory interface 122, a processor 124 (for example, a microprocessor, a microcontroller, a field-programmable gate array ["FPGA"] semiconductor, an application specific integrated circuit ["ASIC"], or another suitable programmable device), and a memory 126 (for example, a random access memory ["RAM"], a read-only memory ["ROM"], a non-transitory computer readable medium, or a combination thereof). In some examples, the memory 126 may be configured to store data and/or commands that may be executable by the processor 124. The controller 106 is illustrated in FIG. 1 in a simplified form. One skilled in the art would recognize that a controller for a non-volatile memory may include additional modules or components other than those specifically illustrated in FIG. 1. Additionally, although the data storage device 102 is illustrated in FIG. 1 as including the controller 106, in other implementations, the controller 106 is instead located within the host device 108 or is otherwise separate from the data storage device 102. As a result, operations that would normally be performed by the controller 106 (for example, wear leveling, bad block management, data scrambling, garbage collection, address mapping, etc.) can be performed fully or in part by the host device 108 or another device that connects to the data storage device 102.

The controller 106 is configured to receive data and commands from the host device 108 and to send data to the host device 108. For example, the controller 106 may send data to the host device 108 via the host interface 120, and the controller 106 may receive data from the host device 108 via the host interface 120. The controller 106 is configured to send data and commands (e.g., a memory operation, which may be a command provided to the non-volatile memory 104) to the non-volatile memory 104 and to receive data from the non-volatile memory 104. For example, the controller 106 is configured to send data and a write command to cause the non-volatile memory 104 to store data to a specified address of the non-volatile memory 104. The write command may specify a physical address of a portion of the non-volatile memory 104 (e.g., a physical address of a word line of the non-volatile memory 104) that is to store the data.

The controller 106 is configured to send a read command to the non-volatile memory 104 to access data from a specified address of the non-volatile memory 104. The read command may specify the physical address of a region of the non-volatile memory 104 (e.g., a physical address of a word line of the non-volatile memory 104). The controller 106 may also be configured to send data and commands to the non-volatile memory 104 associated with background scanning operations, garbage collection operations, and/or wear-leveling operations, or other suitable memory operations.

The controller 106 may send a memory operation (e.g., a read command) to the non-volatile memory 104 to cause read/write circuitry to sense data stored in a storage element. For example, the controller 106 may send the read command to the non-volatile memory 104 in response to receiving a request for read access from the host device 108. In response to receiving the read command, the non-volatile memory 104 may sense the storage element (e.g., using the read/write circuitry) to generate one or more sets of bits representing the stored data.

Figure 2:
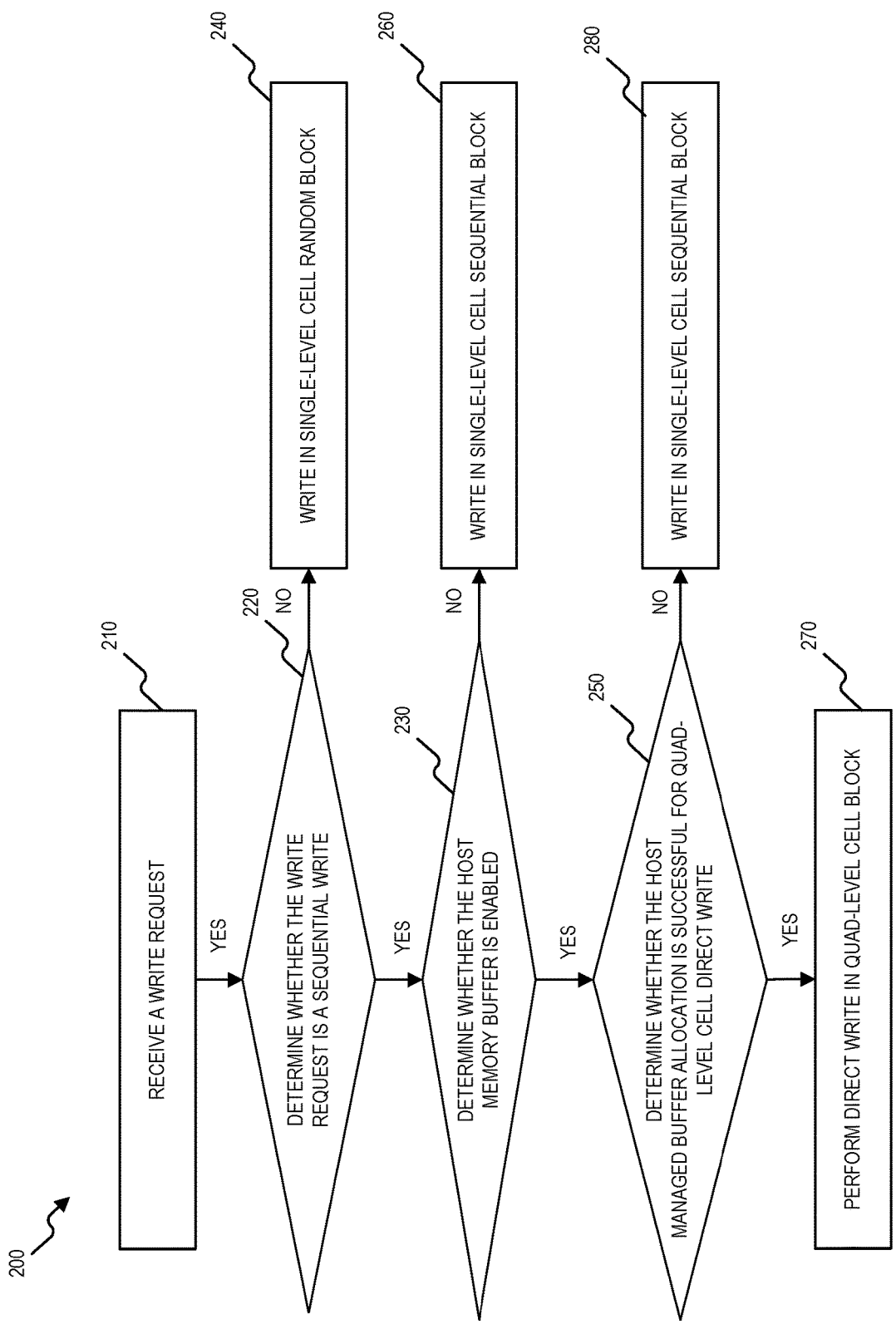
FIG. 2 a flow chart illustrating a method for handling write operations of a QLC based data storage device, according to some embodiments.

Turning now to FIG. 2, a method 200 for handling write operations of a QLC based data storage device, according to some embodiments. The method 200 includes the data storage device 102 receives a write request from the host device 108 (e.g., via the communication path 110)(at block 210). The write request received may indicate a request from the host device 108 to store a portion of data to the non-volatile memory 104 of the data storage device 102.

A sequential write is a disk access pattern where contiguous blocks of data are written to adjacent locations in a memory of a data storage. A random write is a disk access pattern where blocks of data are written to random locations of a memory of a data storage device (e.g., in the non-volatile memory 104).

The method 200 includes the processor 124 of the data storage device 102 determining whether the write request is a sequential write (at decision block 220). The processor 124 may, for example, determine that the write request is a sequential write based on an analysis of the write request sent by host device 108.

When the processor 124 of the data storage device 102 determines that the write request received at block 210 is a sequential write ("Yes" at decision block 220), the method 200 includes the processor 124 determining whether the host memory buffer is enabled (at decision block 230). When the processor 124 determines that the write request received at block 210 is not a sequential write ("No" at decision block 220), the method 200 includes the processor 124 controlling the data to be written to an SLC random block of the non-volatile memory 104 (at block 240).

When the processor 124 determines that the HMB of the data storage device 102 is enabled ("Yes" at decision block 230), the processor 124 determines whether the HMB allocation is successful for a QLC direct write operation (at decision block 250). When the processor 124 determines that the HMB of the data storage device 102 is not enabled ("No" at decision block 230), the method 200 includes the processor 124 controlling the data to be written in a SLC sequential block of the non-volatile memory 104 (at block 260).

When the processor 124 determines that the HMB allocation is successful for a QLC direct write ("Yes" at decision block 250), the method 200 includes the processor 124 controlling the data to be written in a QLC block of the non-volatile memory 104 (at block 270). When the processor 124 determines that the HMB allocation is not successful for a QLC direct write ("No" at decision block 250), the method 200 includes the processor 124 controlling the data to be written to a SLC sequential block of the non-volatile memory 104 (at block 280).

Figure 3:
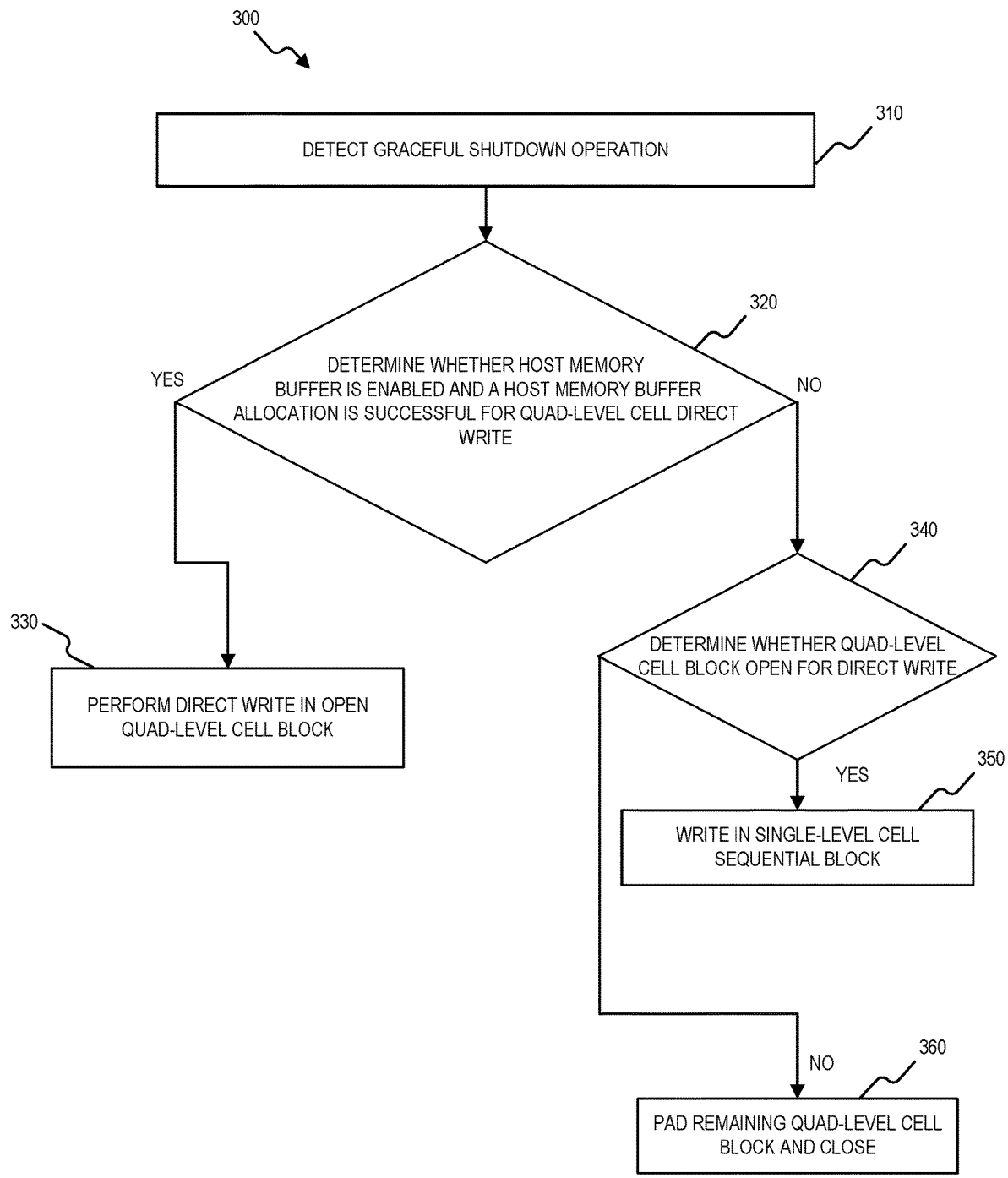
FIG. 3 is a flow chart illustrating a method for handling a power state transition from a graceful shutdown, according to some embodiments.

Turning now to FIG. 3, a flow chart illustrating a method 300 for handling a power state transition from a graceful shutdown, according to some embodiments. The method 300 includes the processor 124 detecting the data storage device 102 has mounted after a graceful shutdown (at block 310). For the purposes of this disclosure, a graceful shutdown may be defined as an operation wherein the data storage device 102 is turned off by a software function of the data storage device 102 and the operating system ("OS") of the data storage device is allowed to perform various tasks as part of safely shutting down the data storage device 102 and closing the connection.

Upon detecting that the data storage device 102 has mounted after the graceful shutdown, the method 300 includes the processor 124 determining whether the HMB of the data storage device 102 is enabled and the HMB allocation is successful for the QLC direct write operation (at decision block 320). When the processor 124 determines that the HMB is enabled and the HMB allocation is successful for the QLC direct write operation ("Yes" at decision block 320), the method 300 includes the processor 124 performing a direct write in an open QLC block of the non-volatile memory 104 (at block 330).

When the processor 124 determines the HMB of the data storage device 102 is not enabled and/or the HMB allocation is not successful for the QLC direct write operation ("No" at decision block 320), the method 300 includes the processor 124 determining whether a QLC block of the non-volatile memory 104 is open for a direct write operation (at decision block 340). When the processor 124 determines that a QLC block of the data storage device 102 is open for a direct write operation ("Yes" at decision block 340), the method 300 includes the processor 124 performing a write operation in a SLC sequential block of the non-volatile memory 104 (at block 350). When the processor 124 determines a QLC block of the data storage device 102 is not open for a direct write operation ("No" at decision block 340), the method 300 includes the processor 124 controlling the remainder of the QLC block to be padded and closed (at block 360).

Figure 4:
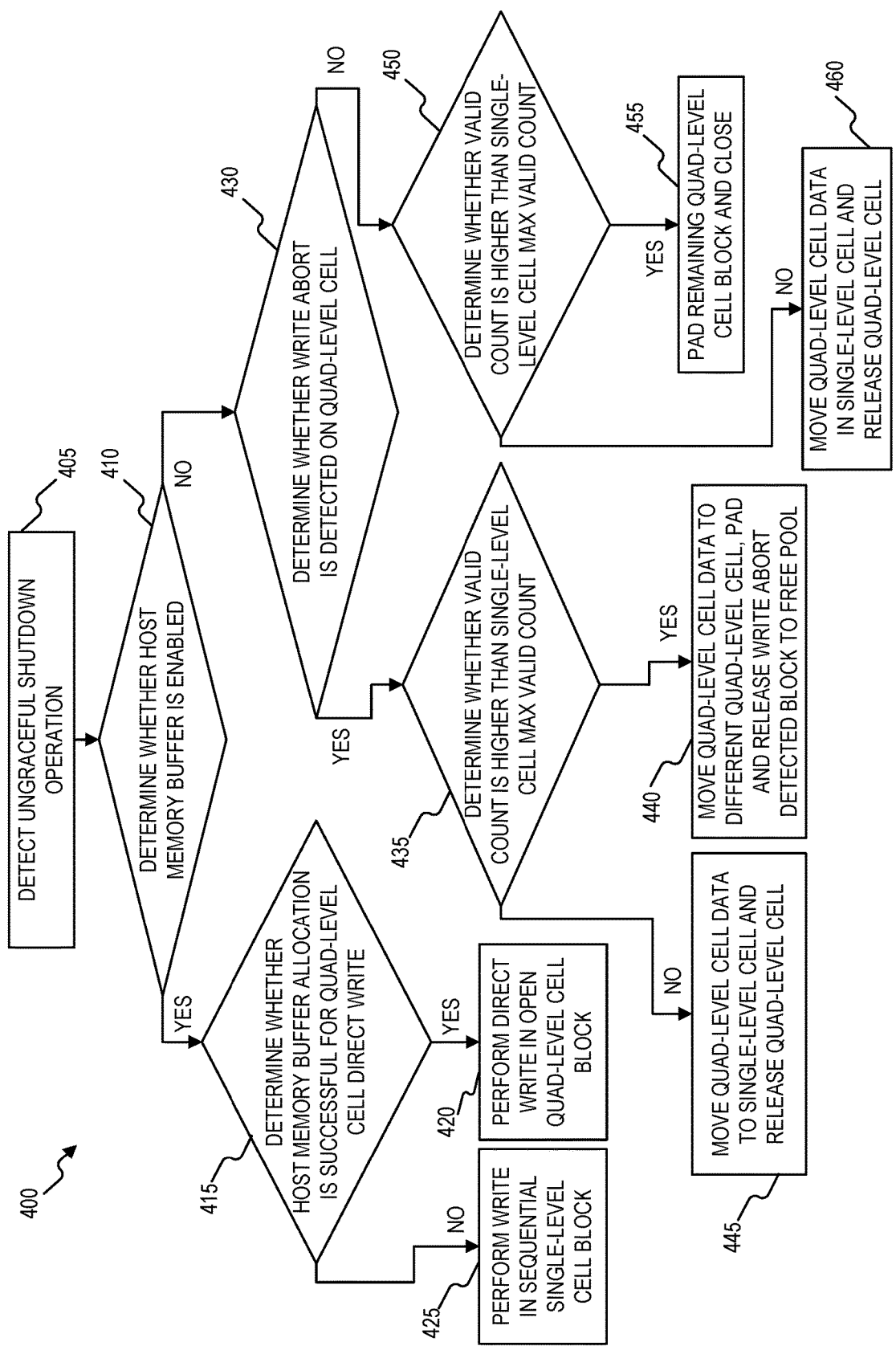
FIG. 4 is a flow chart illustrating a method for handling a power state transition from a ungraceful shutdown, according to some embodiments.

Turning now to FIG. 4, a flow chart illustrating a method 400 for handling a power state transition from a ungraceful shutdown is shown, according to some embodiments. The method 400 includes the processor 124 detecting that the data storage device 102 has mounted from an ungraceful shutdown operation (at block 405). For the purposes of this disclosure, an ungraceful shutdown (or a hard shutdown) may be defined by any situation or operation where the data storage device 102 is shut down by an interruption of power.

The method 400 includes the processor 124 determining whether the HMB of the data storage device 102 is enabled (at decision block 410). When the processor 124 determines that the HMB is enabled ("Yes" decision block 410), the method 400 includes the processor 124 determining whether a HMB allocation is successful for a QLC direct write operation (at decision block 415). When the processor 124 determines a HMB allocation is successful for a QLC direct write operation ("Yes" at decision block 415), the method 400 includes the processor 124 performing a direct write operation in an open QLC block of the non-volatile memory 104 (at block 420). When the processor 124 determines a HMB allocation is not successful for a QLC direct write operation ("No" at block 415), the method 400 includes the processor 124 performing a write operation to a sequential SLC block of the non-volatile memory 104 (at block 425).

When the processor 124 determines that the HMB is not enabled ("No" at decision block 410), the method 400 includes the processor 124 determining whether a write abort operation is detected on a QLC block of the non-volatile memory 104. When a write abort operation is detected on a QLC of the non-volatile memory 104 ("Yes" at decision block 430), the method 400 includes the processor 124 determining whether a valid count is higher than an SLC max valid count (at decision block 435). The valid count or valid fragment count indicates a number of valid flash memory units (FMU) in an available block. The valid count or the valid fragment count is reduced due to host invalidation of logical block addressing (LBA). For a one meta die case (e.g., capacity of 512 GB) BiCS4 X4 for SLC block may hold max of 0x3000 (12,288) FMUs (each FMU is 4 k and indicates a valid count) and for QLC it is 0xC000 (49,152) FMUs (96 word lines*4 strings*32 KB page size). Alternatively, for a one meta die case BiCS5×4 SLC block may hold max 0x3800 (14,336) FMUs (each FMU is 4 k and indicates a valid count) and QLC block 0xE000 (57,344) FMUs (112 word lines*4 strings*32 KB page size).

When the valid count is higher than the SLC max valid count ("Yes" at block 435), the method 400 includes the processor 124 moving data to a different QLC in the non-volatile memory 104, and pads and releases the write abort detected QLC block to free pool of the data storage device 102 (at block 440). When the valid count is not higher than the SLC max valid count ("No" at decision block 435), the method 400 includes the processor 124 moving the data stored in the QLC block to a SLC block and releases the QLC block (at block 445).

When the processor 124 determines that a write abort operation is not detected on a QLC block of the data storage device 102 ("No" at decision block 430), the method 400 includes the processor 124 determining whether a valid count is higher than an SLC max valid count (at decision block 450). When the valid count is higher than the SLC max valid count ("Yes" at decision block 450), the method 400 includes the processor 124 padding the remainder of the QLC block and closes the QLC block (at block 455). When the valid count is not higher than the SLC max valid count ("No" at decision block 450), the method 400 includes the processor 124 moving the data stored to the QLC block to an SLC block and releases the QLC block (at block 460).

Turning now to FIG. 5, a table 500 illustrating timing data for basic NAND operations is shown, according to some embodiments. The table 500 contains various operations necessary for performing basic NAND functions of the data storage device. For example, the table 500 includes a QLC foggy program, a QLC fine program, an SLC program average, an SLC sense, a QLC lower page, middle page, top page (LP/MP/TP) sense, a QLC upper page (UP) sense AP NR (AIPR (Asynchronous Independent Plane Read) Normal Read), an SLC erase, and a QLC erase. The table 500 also includes timing information (in microseconds) for each of the basic NAND operations listed in the table 500. In the example shown in table 500, the total latency for basic NAND operations of the data storage device 102 is 21,762 microseconds. It is to be understood that although a limited set of basic NAND operations are shown in the table 500, one of ordinary skill in the art would understand additional or different basic NAND operations may be included in the table 500.

FIG. 6 shows a table 600 illustrating timing data for QLC write with folding and QLC direct write operations, according to some embodiments. The table 600 lists various operations included in performing QLC write with folding as well as various operations included in performing a QLC direct write. The operations shown in table 600 for performing a QLC write with folding include: an SLC write to four blocks that takes 245760 microseconds (µs), an SLC read to four blocks that takes 69120 µs, a QLC foggy write to one block that takes 1152000 µs, a QLC fine write to one block that takes 2588928 µs, an SLC erase that takes 20000 µs, and a QLC erase that takes 6500 µs. In the example shown, the total latency for a QLC block write with folding is 4,082,308 microseconds.

The table 600 also includes timing information (in microseconds) for each of the operations associated with a QLC direct write. The operations shown in table 600 for performing a QLC direct write to the data storage device 102 include a QLC direct write of one block that takes 2588928 µs and a QLC erase that takes 6500 µs. In the example shown, the total latency for QLC direct write is 2,595,428 microseconds. In other words, in the example shown, the QLC direct write improves write speed by approximately 36% over the QLC folding approach.

It is to be understood that although a limited set of QLC write with folding and QLC direct write operations are shown in the table 600, additional or different QLC write with folding and QLC direct write operations may be included a table containing timing information of QLC write with folding and QLC direct write operations. For example, a QLC direct write may further include a step involving a QLC foggy write of one block and a QLC fine write of one block.

Folding may include, for example, receiving data at the data storage device 102 from a QLC source (e.g., the host device 108). The data may be written to and processed as transit SLC blocks then written to a QLC target. Disadvantages to folding include, for example, performance degradation during sustained host writes, write amplification on SLC blocks, and inefficient handling of SLC program erase cycle ("PEC"). Accordingly, performing QLC direct write is advantageous in view of folding techniques in that burst/sustained write performance is improved, power consumption is reduced due to less relocation, write amplification is reduced on X1 blocks, helping in efficient PEC management, firmware flow is simplified, and there is not additional impact on data loss due to ungraceful shutdown. Accordingly, utilizing the data storage device 102 to implement the methods 200-400 described above, performs QLC direct write operations, which results in increased performance when compared to QLC block write operations using the folding method.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device comprising:
   a non-volatile memory; and
   a controller configured to:
   receive a request to write data to the non-volatile memory,
   determine whether the request to write the data is a sequential write operation,
   determine whether a host memory buffer of the data storage device is enabled,
   determine whether a host memory buffer allocation is successful for a quad-level cell direct write, and
   responsive to determining that the request to write the data is not the sequential write operation, the host memory buffer of the data storage device is enabled, and the host memory buffer allocation is successful for the quad-level cell direct write,
   perform a direct write operation in a quad-level cell block of the non-volatile memory,
   wherein the controller is further configured to:
   responsive to determining that the host memory buffer is not enabled, perform a write operation to a single-level cell sequential block of the non-volatile memory.

2. The data storage device of claim 1, wherein the controller is further configured to:
   responsive to determining that the write request is the sequential write operation, perform a write operation to a single-level cell random block of the non-volatile memory.

3. A data storage device comprising:
   a non-volatile memory; and
   a controller configured to:
   receive a request to write data to the non-volatile memory,
   determine whether the request to write the data is a sequential write operation,
   determine whether a host memory buffer of the data storage device is enabled,
   determine whether a host memory buffer allocation is successful for a quad-level cell direct write, and
   responsive to determining that the request to write the data is not the sequential write operation, the host memory buffer of the data storage device is enabled, and the host memory buffer allocation is successful for the quad-level cell direct write, perform a direct write operation in a quad-level cell block of the non-volatile memory, wherein the controller is further configured to:
   responsive to determining that the host memory buffer allocation is not successful for the quad-level cell direct write operation, perform a write operation to a single-level cell sequential block of the non-volatile memory.

4. A data storage device comprising:
   a non-volatile memory; and
   a controller configured to:
   receive a request to write data to the non-volatile memory,
   determine whether the request to write the data is a sequential write operation,
   determine whether a host memory buffer of the data storage device is enabled,
   determine whether a host memory buffer allocation is successful for a quad-level cell direct write, and
   responsive to determining that the request to write the data is not the sequential write operation, the host memory buffer of the data storage device is enabled, and the host memory buffer allocation is successful for the quad-level cell direct write, perform a direct write operation in a quad-level cell block of the non-volatile memory, wherein the controller is further configured to:
   detect a graceful shutdown operation has occurred,
   responsive to detecting the graceful shutdown operation has occurred, determining that the host memory buffer is enabled, and determining that the host memory buffer allocation is successful for the quad-level cell direct write, perform a direct write operation in an open quad-level cell block of the non-volatile memory.

5. The data storage device of claim 4, wherein the controller is further configured to:
   responsive to determining that the host memory buffer is not enabled and the host memory buffer allocation is not successful for the quad-level cell direct write, determine whether the quad-level cell block of the non-volatile memory is open for direct write, and
   responsive to determining that the quad-level cell block of the non-volatile memory is open for direct write, performing a write operation in a single-level cell sequential block of the non-volatile memory.

6. The data storage device of claim 5, wherein the controller is further configured to:
   responsive to determining that the quad-level cell block of the non-volatile memory is not open for direct write, padding a remainder of the quad-level cell block of the non-volatile memory and closing the quad-level cell block of the non-volatile memory.

7. The data storage device of claim 1, wherein the controller is further configured to: perform at least one operation selected from a group including:
- a quad-level cell foggy program operation,
- a quad-level cell fine program operation,
- a single-level cell program average operation,
- a single-level cell sense operation,
- a quad-level cell lower page, middle page, top page (LP/MP/TP) sense operation,
- a quad-level cell upper page (UP) sense AP NR operation,
- a single-level cell erase operation, and
- a quad-level cell erase operation.

8. The data storage device of claim 1, wherein the controller is further configured to:
- perform the quad-level cell direct write on a block of the non-volatile memory, and
- perform a quad-level cell erase operation.

9. A method performed by a data storage device, the method comprising:
- receiving, with a controller, a request to write data to a non-volatile memory of the data storage device;
- determining, with the controller, whether the request to write the data is a sequential write operation;
- determining, with the controller, whether a host memory buffer of the data storage device is enabled;
- determining, with the controller, whether a host memory buffer allocation is successful for a quad-level cell direct write;
- responsive to determining that the request to write the data is not the sequential write operation, the host memory buffer of the data storage device is enabled, and the host memory buffer allocation is successful for the quad-level cell direct write, performing, with the controller, a direct write operation in a quad-level cell block of the non-volatile memory;
- detecting an ungraceful shutdown operation has occurred;
- responsive to detecting the ungraceful shutdown operation has occurred, determining that the host memory buffer of the data storage device is enabled, and determining that the host memory buffer allocation is successful for the quad-level cell direct write operation, performing the direct write operation in an open quad-level cell block of the non-volatile memory; and
- responsive to detecting the ungraceful shutdown operation has occurred, determining that the host memory buffer of the data storage device is enabled, and determining that the host memory buffer allocation is not successful for the quad-level cell direct write operation, performing a write operation in a single-level cell sequential block of the non-volatile memory.

10. A method performed by a data storage device, the method comprising:
- receiving, with a controller, a request to write data to a non-volatile memory of the data storage device;
- determining, with the controller, whether the request to write the data is a sequential write operation;
- determining, with the controller, whether a host memory buffer of the data storage device is enabled;
- determining, with the controller, whether a host memory buffer allocation is successful for a quad-level cell direct write;
- responsive to determining that the request to write the data is not the sequential write operation, the host memory buffer of the data storage device is enabled, and the host memory buffer allocation is successful for the quad-level cell direct write, performing, with the controller, a direct write operation in a quad-level cell block of the non-volatile memory;
- detecting an ungraceful shutdown operation has occurred;
- responsive to detecting the ungraceful shutdown operation has occurred and determining that the host memory buffer of the data storage device is not enabled, determining whether a write abort operation is detected on the quad-level cell block of the non-volatile memory,
- responsive to determining that the write abort operation is detected on the quad-level cell block of the non-volatile memory, determining whether a valid count is higher than a single-level cell max valid count, and
- responsive to determining that the valid count is higher than the single-level cell max valid count, moving second data in the quad-level cell block to a second quad-level cell block, and padding and releasing the quad-level cell block to a free pool in the non-voltage memory.

11. The method of claim 10, further comprising:
- responsive to determining the valid count is not higher than the single-level cell max valid count, moving second data of the quad-level cell to a single-level cell and releasing the quad-level cell.

12. The method of claim 10, further comprising:
- responsive to determining that the write abort operation is not detected on the quad-level cell block of the non-volatile memory, determining whether the valid count is higher than the single-level cell max valid count, and
- responsive to determining that the valid count is higher than the single-level cell max valid count, padding a remainder of the quad-level cell block and closing the quad-level cell block.

13. The method of claim 12, further comprising:
- responsive to determining the valid count is not higher than the single-level cell max valid count, moving the second data of the quad-level cell to a single-level cell and releasing the quad-level cell.

14. An apparatus, comprising:
- means for receiving a request to write data to a non-volatile memory of a data storage device;
- means for determining whether the request to write the data is a sequential write operation;
- means for determining whether a host memory buffer of the data storage device is enabled;
- means for determining whether a host memory buffer allocation is successful for a quad-level cell direct write;
- means for performing a direct write operation in a quad-level cell block of the non-volatile memory in response to determining that the request to write the data is not the sequential write operation, the host memory buffer of the data storage device is enabled and the host memory buffer allocation is successful for the quad-level cell direct write;
- means for detecting an ungraceful shutdown operation has occurred;
- means for performing the direct write operation in an open quad-level cell block of the non-volatile memory in response to detecting the ungraceful shutdown operation has occurred, determining that the host memory buffer of the data storage device is enabled, and determining that the host memory buffer allocation is successful for the quad-level cell direct write operation; and
- means for performing a write operation in a single-level cell sequential block of the non-volatile memory in response to detecting the ungraceful shutdown operation has occurred, determining that the host memory buffer of the data storage device is enabled, and determining that the host memory buffer allocation is not successful for the quad-level cell direct write operation.

15. An apparatus, comprising:

means for receiving a request to write data to a non-volatile memory of a data storage device;

means for determining whether the request to write the data is a sequential write operation;

means for determining whether a host memory buffer of the data storage device is enabled;

means for determining whether a host memory buffer allocation is successful for a quad-level cell direct write;

means for performing a direct write operation in a quad-level cell block of the non-volatile memory in response to determining that the request to write the data is not the sequential write operation, the host memory buffer of the data storage device is enabled and the host memory buffer allocation is successful for the quad-level cell direct write;

means for detecting an ungraceful shutdown operation has occurred;

means for determining whether a write abort operation is detected on the quad-level cell block of the non-volatile memory in response to detecting the ungraceful shutdown operation has occurred and determining that the host memory buffer of the data storage device is not enabled;

means for determining whether a valid count is higher than a single-level cell max valid count in response to determining that the write abort operation is detected on the quad-level cell block of the non-volatile memory; and means for moving second data in the quad-level cell block to a second quad-level cell block, and padding and releasing the quad-level cell block to a free pool in the non-voltage memory in response to determining that the valid count is higher than the single-level cell max valid count.

16. The apparatus of claim 15, further comprising:

means for moving data of the quad-level cell to a single-level cell and releasing the quad-level cell in response to determining the valid count is not higher than the single-level cell max valid count.

17. The apparatus of claim 15, further comprising:

means for determining whether the valid count is higher than the single-level cell max valid count in response to determining that the write abort operation is not detected on the quad-level cell block of the non-volatile memory; and means for padding a remainder of the quad-level cell block and closing the quad-level cell block in response to determining that the valid count is higher than the single-level cell max valid count.

* * * * *